United States Patent
Huang et al.

(10) Patent No.: US 7,826,150 B2
(45) Date of Patent: Nov. 2, 2010

(54) OPTICAL LENS

(75) Inventors: Yi-Mou Huang, Taipei Hsien (TW);
Hsin-Ho Lee, Taipei Hsien (TW);
Yang-Chang Chien, Taipei Hsien (TW);
Tsai-Shih Tung, Taipei Hsien (TW);
Wei-Cheng Ling, Taipei Hsien (TW);
Kun-I Yuan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 32 days.

(21) Appl. No.: 12/411,513

(22) Filed: Mar. 26, 2009

(65) Prior Publication Data

US 2009/0268297 A1   Oct. 29, 2009

(30) Foreign Application Priority Data

Apr. 25, 2008   (CN) .................. 2008 1 0301312

(51) Int. Cl.
*G02B 3/00* (2006.01)
*G02B 9/02* (2006.01)
*G02B 5/28* (2006.01)

(52) U.S. Cl. .............. 359/722; 359/738; 359/589
(58) Field of Classification Search .......... 359/589, 359/722, 738
See application file for complete search history.

(56) References Cited

U.S. PATENT DOCUMENTS

| | | | | |
|---|---|---|---|---|
| 6,164,777 | A * | 12/2000 | Li et al. ................ | 351/162 |
| 6,813,096 | B2 * | 11/2004 | Ohta ..................... | 359/719 |
| 6,898,026 | B2 * | 5/2005 | Jewers et al. ......... | 359/738 |
| 2009/0323204 | A1 * | 12/2009 | Huang ................. | 359/738 |

* cited by examiner

*Primary Examiner*—David N Spector
(74) *Attorney, Agent, or Firm*—Clifford O. Chi

(57) ABSTRACT

A lens includes a central optical portion, a peripheral portion surrounding the central optical portion, a first ZnS coating formed on the central optical portion and the peripheral portion at one side of the lens, and a first $MgF_2$ coating formed the central optical, the peripheral portion being free of $MgF_2$ coating formed thereon. The optical thickness of the first ZnS coating is one quarter of a wavelength of predetermined light passing therethrough. The optical thickness of the first $MgF_2$ coating is one quarter of the wavelength of the predetermined light.

6 Claims, 3 Drawing Sheets

OPTICAL LENS

BACKGROUND

1. Technical Field

The present disclosure generally relates to the optical imaging field, and particularly to a optical lens.

2. Description of Related Art

With the development of optical imaging technology, lenses are widely used in a variety of portable electronic devices, such as mobile phones, and personal digital assistants. Generally, a lens includes a substantially circular central optical portion, and an annular peripheral portion surrounding the central optical portion. In order to achieve desired image quality, the peripheral portion is often coated with matte lacquer. However, during the lacquer process, it is not uncommon for the lens to break. Production efficiency of the lens is thus low.

What is needed, therefore, is a lens, and a method for coating the lens, which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
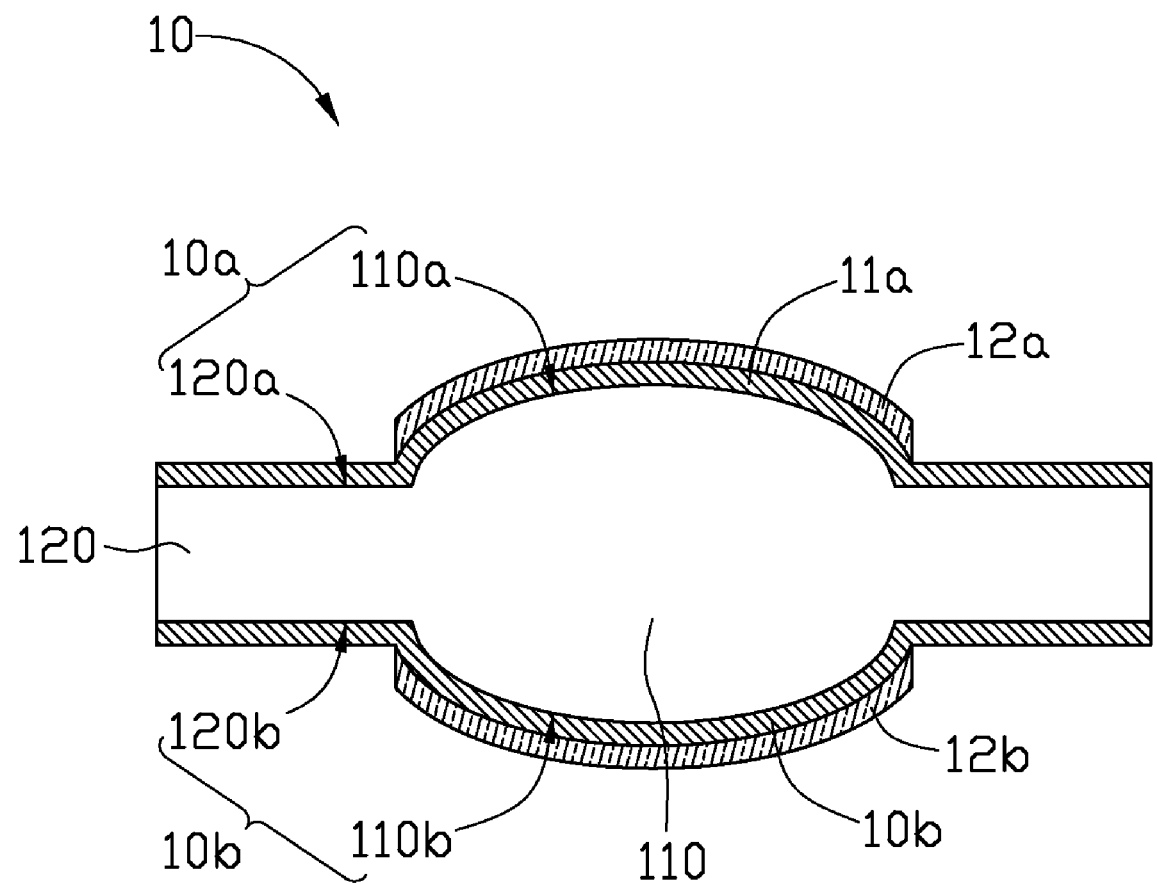
FIG. 1 is a schematic cross-section view of a lens according to an exemplary embodiment.

Referring to FIG. 1, a lens 10, in accordance with an exemplary embodiment, includes a substantially circular central optical portion 110, an annular peripheral portion 120 surrounding the central optical portion 110, a first surface 10a comprising a first portion 110a corresponding to the central optical portion 110 and a second portion 120a corresponding to the peripheral portion 120, and a second surface 10b opposite to the first surface 10a. The second surface 10b includes a first portion 110b opposite to the first portion 110a, and a second portion 120b opposite to the second portion 120a.

A first ZnS (zinc-sulfide) coating 11a is formed on the first and second portions (110a, 120a) of the first surface 10a. The optical thickness of the first ZnS coating 11a is one quarter of a wavelength of predetermined light passing therethrough. In this embodiment, the predetermined light is green light, but can be any color. One portion of the first ZnS coating 11a overlaid on the second portion 120a is reflective to green light.

A second ZnS coating 11b is formed on the first and second portions (110b, 120b) of the second surface 10b. The second ZnS coating 11b is the same as the first ZnS coating 11a.

A first MgF$_2$ (magnesium fluoride) coating 12a is formed on a portion of the first ZnS coating 11a corresponding to the central optical portion 110. The optical thickness of the MgF$_2$ coating 12a is one quarter of the wavelength of green light. Another portion of the first ZnS coating 11a overlaid on the first portion 110a of the first surface 10a and the first MgF$_2$ coating 12a are cooperatively antireflective to green light. The peripheral portion 120 and the central optical portion 110 have different reflective properties for achieving desired image quality.

A second MgF$_2$ coating 12b is formed on a portion of the first ZnS coating 11b corresponding to the central optical portion 110. The second MgF$_2$ coating 12b is the same as the first MgF$_2$ coating 12a.

Lens 10 may, alternatively, not include the second ZnS coating 11b and the second MgF$_2$ coating 12b.

Figure 2:
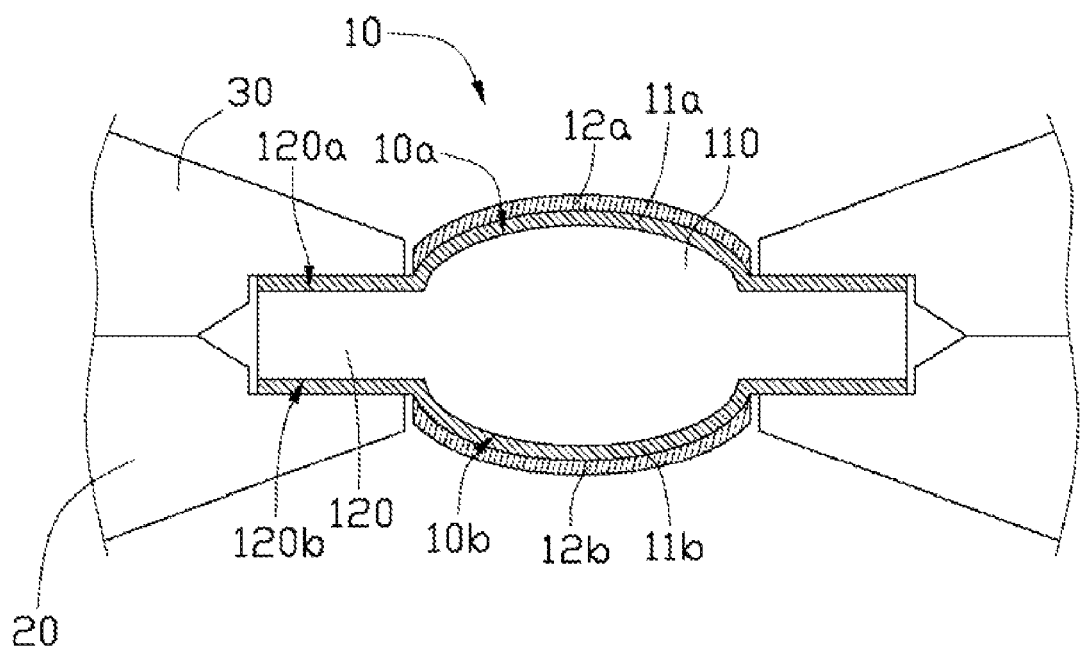
FIG. 2 is a schematic cross-section view of the lens of FIG. 1 held in place using trays for coating process.
Figure 3:
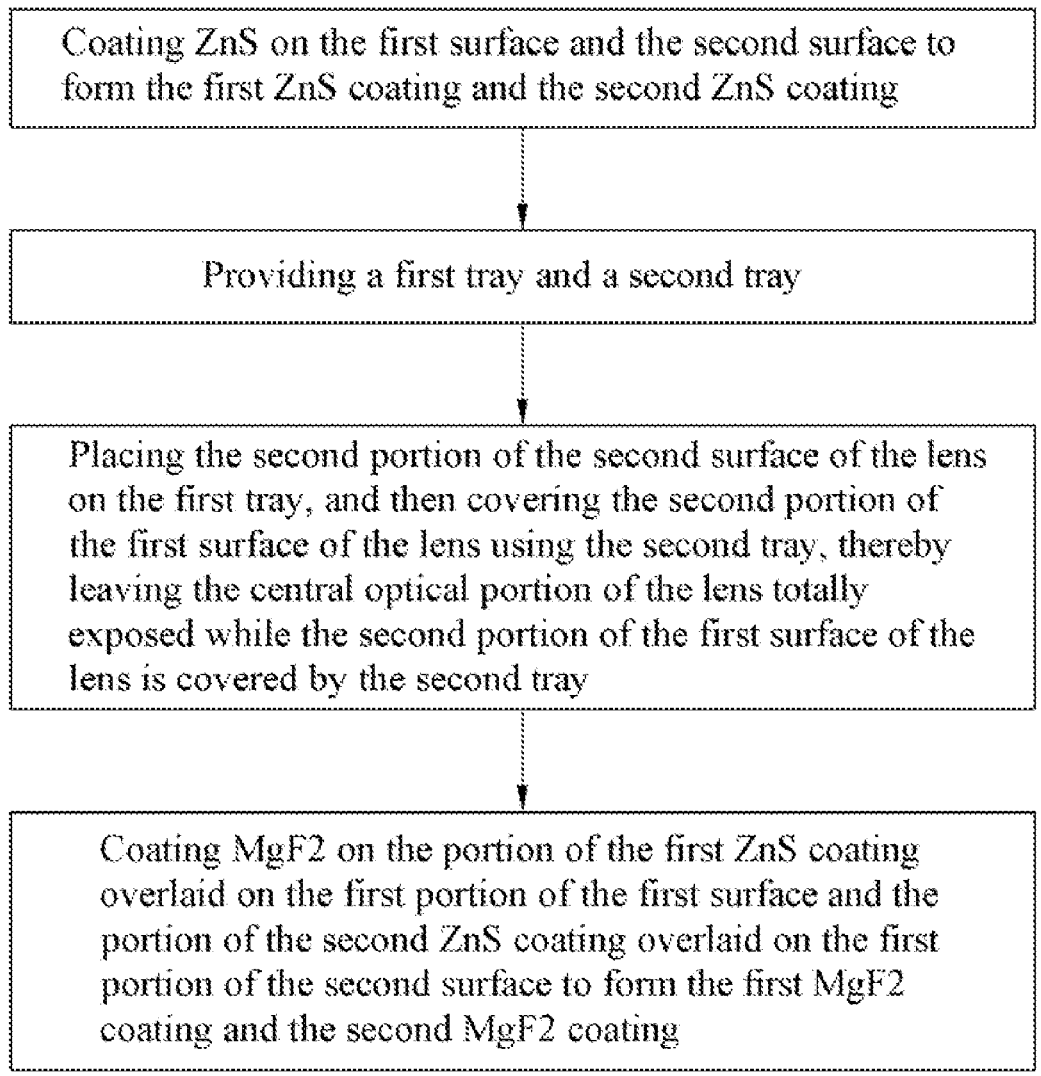
FIG. 3 is a flowchart of a method for coating a lens.

FIGS. 2 and 3, show a method for coating the lens 10 having the first surface 10a and the second surface 10b. The second portion 120a of the first surface 10a is corresponding to the peripheral portion 120 of the lens 10. The second portion 120b of the second surface 10b is opposite to the second portion 120a.

In Step 1, ZnS is coated on the first surface 10a and the second surface 10b of the lens 10 to form the first ZnS coating 11a and the second ZnS coating 11b. In Step 2, a first tray 20 and a second tray 30 are provided, and in Step 3, the second portion 120b of the second surface 10b of the lens 10 is placed on the first tray 20, and then the second portion 120a of the first surface 10a of the lens 10 is covered by the second tray 30, thereby leaving the central optical portion 110 totally exposed while the second portion 120a of the lens 10 is covered by the second tray 30.

In Step 4, MgF$_2$ is coated on the portion of the first ZnS coating 11a overlaid on the first portion 110a of the first surface 10a and the portion of the second ZnS coating 11b overlaid on the first portion 110b of the second surface 10b to form the first MgF$_2$ coating 12a and the second MgF$_2$ coating 12b.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope of the appended claims.

What is claimed is:

1. A lens, comprising:
   a central optical portion;
   a peripheral portion surrounding the central optical portion,
   a first ZnS coating formed on the central optical portion and the peripheral portion at one side of the lens, wherein the optical thickness of the first ZnS coating is one quarter of a wavelength of predetermined light passing therethrough;
   a first MgF$_2$ coating formed on the central optical portion, the peripheral portion being free of MgF$_2$ coating formed thereon, wherein the optical thickness of the first MgF$_2$ coating is one quarter of the wavelength of the predetermined light.

2. The lens as claimed in claim 1, further comprising a second ZnS coating formed on the central optical portion and the peripheral portion at an opposite side of the lens to the first ZnS coating, and a second MgF$_2$ coating formed on the central optical portion at the opposite side of the lens to the first MgF$_2$ coating, wherein the optical thickness of the second ZnS coating is one quarter of the wavelength of the predetermined light, the optical thickness of the second MgF$_2$ coating is one quarter of the wavelength of the predetermined light.

3. A lens, comprising:
   a central optical portion;
   a ZnS coating formed on the central optical portion;

a MgF$_2$ coating formed on the central optical portion, the ZnS coating and the MgF$_2$ coating cooperating to be transparent to predetermined light; and a peripheral portion surrounding the central optical portion, with a ZnS coating formed thereon, the peripheral portion being free of the MgF$_2$ coating formed thereon, wherein the ZnS coating on the peripheral portion is opaque to the predetermined light.

4. The lens as claimed in claim 3, wherein the optical thickness of the ZnS coating on the central optical portion is one quarter of a wavelength of the predetermined light, the optical thickness of the MgF$_2$ coating is one quarter of the wavelength of the predetermined light, and the optical thickness of the ZnS coating on the peripheral portion is one quarter of the wavelength of the predetermined light.

5. The lens as claimed in claim 3, wherein the ZnS coating has a uniform thickness.

6. The lens as claimed in claim 3, wherein the MgF$_2$ coating has a uniform thickness.

* * * * *